US010367908B2

(12) United States Patent
Yevmenkin et al.

(10) Patent No.: US 10,367,908 B2
(45) Date of Patent: *Jul. 30, 2019

(54) EXTENDING CACHING NETWORK FUNCTIONALITY TO AN EXISTING STREAMING MEDIA SERVER

(71) Applicant: LEVEL 3 COMMUNICATIONS, LLC, Broomfield, CO (US)

(72) Inventors: Maksim Yevmenkin, Thousand Oaks, CA (US); Christopher Newton, Westlake Village, CA (US); David Fullagar, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,849

(22) Filed: Jun. 4, 2018

(65) Prior Publication Data

US 2019/0007514 A1 Jan. 3, 2019

Related U.S. Application Data

(63) Continuation of application No. 15/456,443, filed on Mar. 10, 2017, now Pat. No. 9,992,297, which is a continuation of application No. 13/224,507, filed on Sep. 2, 2011, now Pat. No. 9,596,278.

(60) Provisional application No. 61/380,148, filed on Sep. 3, 2010.

(51) Int. Cl.
*H04L 29/08* (2006.01)
*H04L 29/06* (2006.01)

(52) U.S. Cl.
CPC .... *H04L 67/2842* (2013.01); *H04L 29/08729* (2013.01); *H04L 65/4084* (2013.01)

(58) Field of Classification Search
CPC ............ H04L 65/4084; H04L 67/2842; H04L 29/08729
USPC .......................................................... 709/213
See application file for complete search history.

(56) References Cited

U.S. PATENT DOCUMENTS

| 7,707,308 | B1 * | 4/2010 | Hogge, Jr. | H04L 51/38 709/218 |
| 8,140,672 | B2 * | 3/2012 | Crowder | G06F 15/173 709/224 |
| 2004/0010562 | A1 * | 1/2004 | Itonaga | H04L 12/4645 709/213 |
| 2006/0064478 | A1 * | 3/2006 | Sirkin | H04L 29/12066 709/223 |
| 2006/0080446 | A1 * | 4/2006 | Bahl | H04L 29/06 709/227 |
| 2007/0288518 | A1 * | 12/2007 | Crigler | G06F 17/30038 |

(Continued)

OTHER PUBLICATIONS

Canadian Examination Report, dated Jun. 13, 2017, Application No. 2,810,239, filed Sep. 2, 2011; 3 pgs.

(Continued)

*Primary Examiner* — Michael C Lai

(57) ABSTRACT

A content delivery network (CDN) includes multiple cluster sites, including sites with streaming media servers, caching servers and storage devices accessible to the caching servers for storing streaming content. Interface software is configured to initiate retrieval, by a caching server, of electronic streaming resources from the one or more storage devices in response to requests for the electronic streaming resource received by the streaming media server.

12 Claims, 10 Drawing Sheets

(56) References Cited

U.S. PATENT DOCUMENTS

| | | | |
|---|---|---|---|
| 2008/0294694 A1* | 11/2008 | Maghfourian | G06F 17/30855 |
| 2009/0157850 A1* | 6/2009 | Gagliardi | G06F 17/30864 |
| | | | 709/219 |
| 2009/0282159 A1* | 11/2009 | Wang | H04L 61/609 |
| | | | 709/231 |
| 2010/0138534 A1* | 6/2010 | Mutnuru | H04L 43/0817 |
| | | | 709/224 |
| 2010/0146139 A1* | 6/2010 | Brockmann | H04N 21/234318 |
| | | | 709/231 |
| 2010/0235438 A1* | 9/2010 | Narayanan | H04L 65/60 |
| | | | 709/203 |
| 2011/0080940 A1* | 4/2011 | Bocharov | H04N 21/4331 |
| | | | 375/240.01 |
| 2012/0072525 A1 | 3/2012 | Yevmenkin et al. | |
| 2017/0187821 A1 | 6/2017 | Yevmenkin et al. | |

OTHER PUBLICATIONS

European Examination Report, dated Sep. 7, 2016, Application No. 11822724.8, filed Sep. 2, 2011; 8 pgs.

Extended European Search Report, dated Mar. 24, 2014, Application No. 11822724.8, filed Sep. 2, 2011; 12 pgs.

International Preliminary Report on Patentability, dated Mar. 5, 2013, Int'l Appl. No. PCT/US11/050343, Int'l Filing Date Sep. 2, 2011, 8 pgs.

International Search Report, Int'l Application No. PCT/US11/50343, Int'l Filing Date Sep. 2, 2011, dated Jan. 17, 2012, 3 pgs.

Written Opinion, Int'l Application No. PCT/US11/50343, Int'l Filing Date Sep. 2, 2011, dated Jan. 17, 2012, 6 pgs.

Berners-Lee, T. et al., "Uniform Resource Identifier (URI): Generic Syntax", RFC 3986.txt; XP015009757, ISSN:0000-0003 Jan. 1, 2005, 62 pgs.

Nygren, E. et al., "The Akamai Network: A Platform for High-Performance Internet Applications", *ACM Sigops Operating Systems Review* vol. 44, No. 3, XP066107217, ISSN:0163-5980 Aug. 17, 2010, 18 pgs.

Roy, S. et al., "Architecture of a Modular Streaming Media Server for Content Delivery Networks", Proceedings of the 2003 International Conference on Multimedia and Expo: Jul. 6-9, 2003, Baltimore Marriott Waterfront Hotel, Baltimore, Maryland, USA, IEEE Operations Center; vol. 3 Jul. 6, 2003, pp. 569-572.

* cited by examiner

EXTENDING CACHING NETWORK FUNCTIONALITY TO AN EXISTING STREAMING MEDIA SERVER

CROSS-REFERENCE TO RELATED APPLICATIONS

This application is a continuation of and claims the benefit of priority to U.S. patent application Ser. No. 15/456,443, now U.S. Pat. No. 9,992,297, entitled "EXTENDING CACHING NETWORK FUNCTIONALITY TO AN EXISTING STREAMING MEDIA SERVER," filed Mar. 10, 2017, the entire contents of which are fully incorporated by reference herein for all purposes. Application Ser. No. 15/456,443 is a continuation of and claims the benefit of priority to U.S. patent application Ser. No. 13/224,507, now U.S. Pat. No. 9,596,278, entitled "EXTENDING CACHING NETWORK FUNCTIONALITY TO AN EXISTING STREAMING MEDIA SERVER," filed Sep. 2, 2011, the entire contents of which are fully incorporated by reference herein for all purposes.

Application Ser. No. 13/224,507 claims priority to U.S. Provisional Application No. 61/380,148, entitled "EXTENDING CACHING NETWORK FUNCTIONALITY TO AN EXISTING STREAMING MEDIA SERVER," filed Sep. 3, 2010, the entire contents of which are fully incorporated by reference herein for all purposes.

BACKGROUND OF THE INVENTION

Field of the Invention

This invention relates to content delivery and content delivery networks. More specifically, to content delivery networks and systems, frameworks, devices and methods supporting content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CDN means content delivery network;
HTTP means Hyper Text Transfer Protocol;
HTML means Hyper Text Markup Language;
IP means Internet Protocol;
IP address means an address used in the Internet Protocol to identify electronic devices such as servers and the like;
RTMP means Real Time Messaging Protocol;
URL means Uniform Resource Locator; and
VIP address means a virtual IP address.

Background and Overview

Networks that are engaged to deliver electronic resources, such as video, images, audio files, documents, software and the like, to end users on the Internet on behalf of owners or providers of those resources ("content providers") are commonly referred to as Content Delivery Networks (CDNs). A primary purpose of a CDN is to distribute resources efficiently to client machines on behalf of one or more content providers, preferably via a public Internet. Both end-users (clients) and content providers benefit from using a CDN. By using a CDN, a content provider is able to take pressure off of its own servers. Clients benefit by being able to obtain content with fewer delays.

Figure 1:
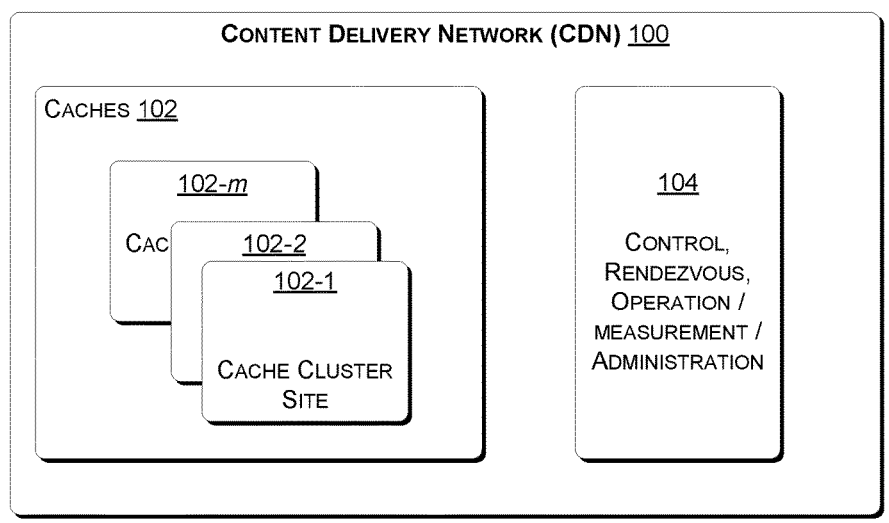
FIG. 1 depicts a content delivery network (CDN)

An example of a CDN is shown in FIG. 1, and represented as CDN 100. An exemplary CDN 100 will typically have multiple points of presence, or cache cluster sites 102-1, 102-2, 102-$m$ (collectively caches 102), located across a wide geographic area. A CDN 100 also includes other components such as, e.g., for control, administration, rendezvous, operation, measurement, etc. (collectively denoted 104 in FIG. 1).

Figure 2:
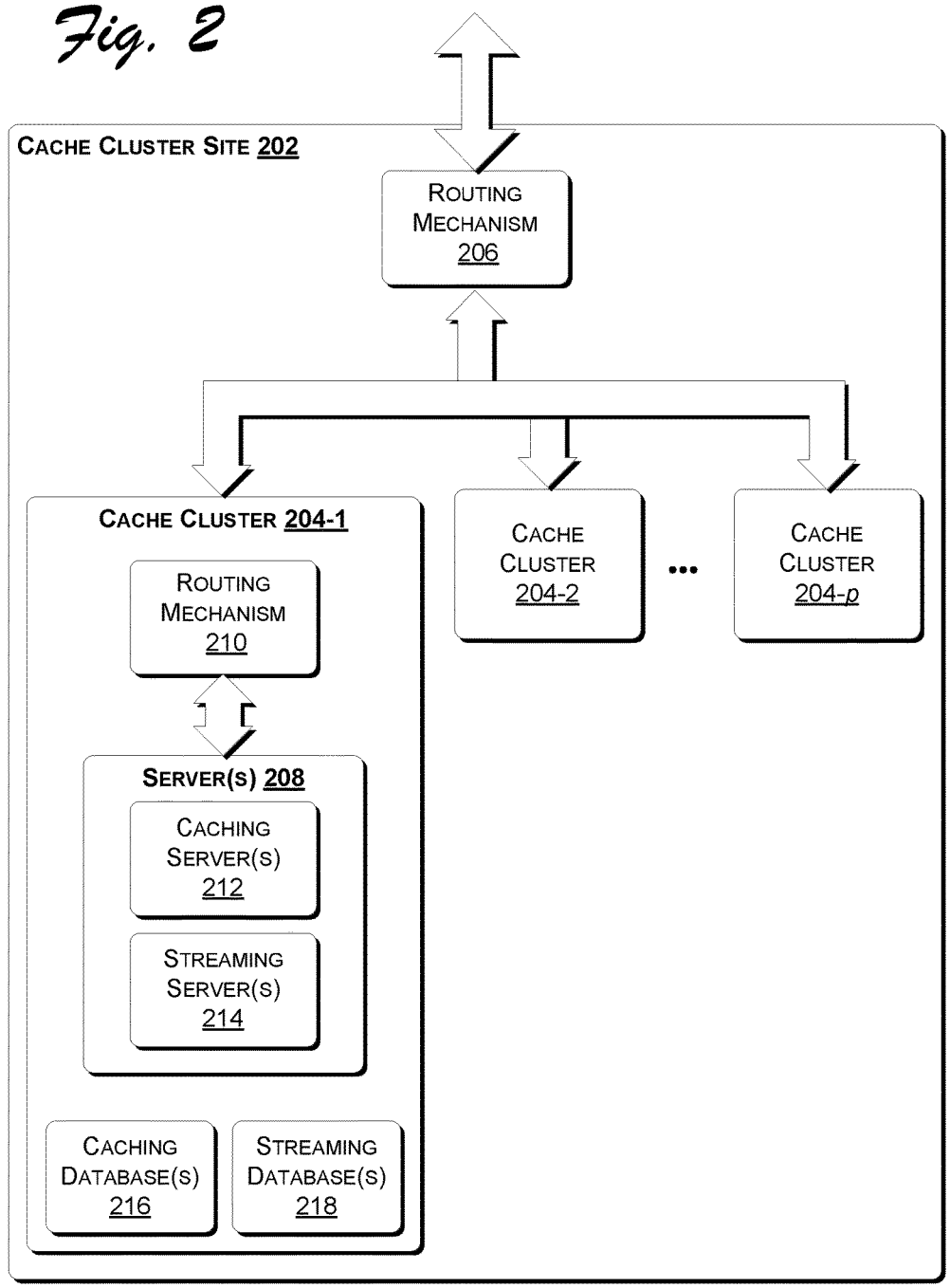
FIG. 2 depicts a cache cluster site in the CDN of FIG. 1.

As shown in FIG. 2, a cache cluster site 102 includes one or more cache clusters 204-1, 204-2, 204-$p$ (collectively cache clusters 204) operatively connected to a routing mechanism 206. The routing mechanism 206 may, e.g., be a switch such as an Ethernet switch. One of the cache clusters, cache cluster 204-1, is shown in greater detail in the drawing. Each cache cluster includes a routing mechanism 210 and one or more servers 208. The routing mechanism 210 may, e.g., be a switch, and it may be part of or the same as routing mechanism 206.

The servers 208 in a cache cluster 204 may include one or more caching servers 212 for delivering electronic resources using the HTTP protocol and one or more streaming servers 214 for delivery of resources using streaming protocols. There are a variety of streaming media formats used in the marketplace, including, e.g., Flash® Media format by Adobe®, QuickTime® format by Apple®, and Windows® Media format by Microsoft®. Each streaming protocol is associated with a different format for streaming media.

As used herein, electronic resources that are to be delivered using a streaming protocol are referred to as streaming resources or streaming media.

The caching server(s) 212 and streaming server(s) 214 within a given cache cluster 204 each have dedicated databases 216 and 218, respectively. The databases 216 for the caching servers 212 store either configuration data or electronic resources, or both, in accordance with various embodiments. Likewise, the databases 218 for the streaming servers 214 store either configuration data or electronic streaming resources, or both, in accordance with various embodiments.

While electronic resources represent the actual files that an end user requests delivery of, configuration data can represent any other form of data associated with end users' requests, such as, e.g., authentication data, authorization information, geographical restrictions, licensing information, or any other attributes, properties or characteristics relevant to content owners, electronic resources or end users. For example, configuration data may include credentials for determining whether a particular end user is authenticated to receive a specific electronic resource, or whether a particular end user is authorized to receive a specific electronic resource, or whether a particular end user is within a geographic location that is authorized to receive a specific electronic resource.

Content providers typically determine the format in which streaming media will be delivered to end users on the Internet, although sometimes this decision is made by CDN operators on behalf of the content owners. Regardless of the format chosen for a particular streaming resource, a proprietary media player designed to play media in accordance with that format is required on the end user's computer, either stand-alone, or as a browser plug-in, in order for that resource to be delivered from the appropriate server.

Figure 3:
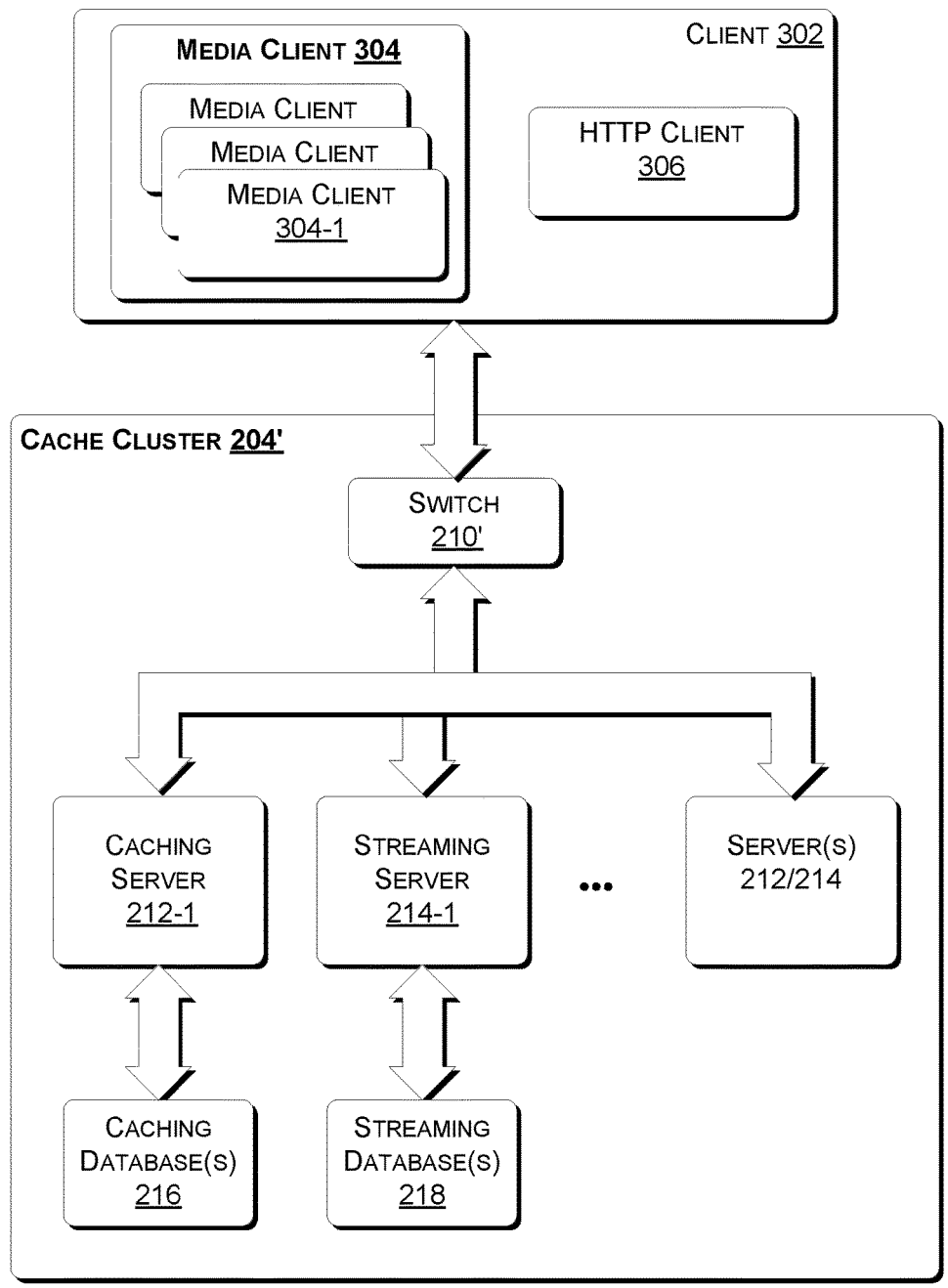
FIGS. 3-4 depict client interaction with a cache cluster.

FIG. 3 shows a client 302 operatively connected with a cache cluster 204'. The cache cluster 204' includes a switch 210' as the routing mechanism. In FIG. 3, exemplary proprietary players are represented as media client(s) 304, it being understood that each streaming media format requires its own media client. The client 302 also includes an HTTP client 306 (e.g., included in a web browser or the like).

The media client(s) 304 and the streaming media server(s) 214 are designed to communicate using proprietary protocols, and a separate streaming media server (generally running on the same server hardware) is required for each different type of proprietary media client. In contrast, with respect to end users requesting an HTML document (e.g., a traditional webpage) using a traditional Internet browser, the caching server(s) 212 are operable to communicate with all such Internet browsers using HTTP.

Figure 4:
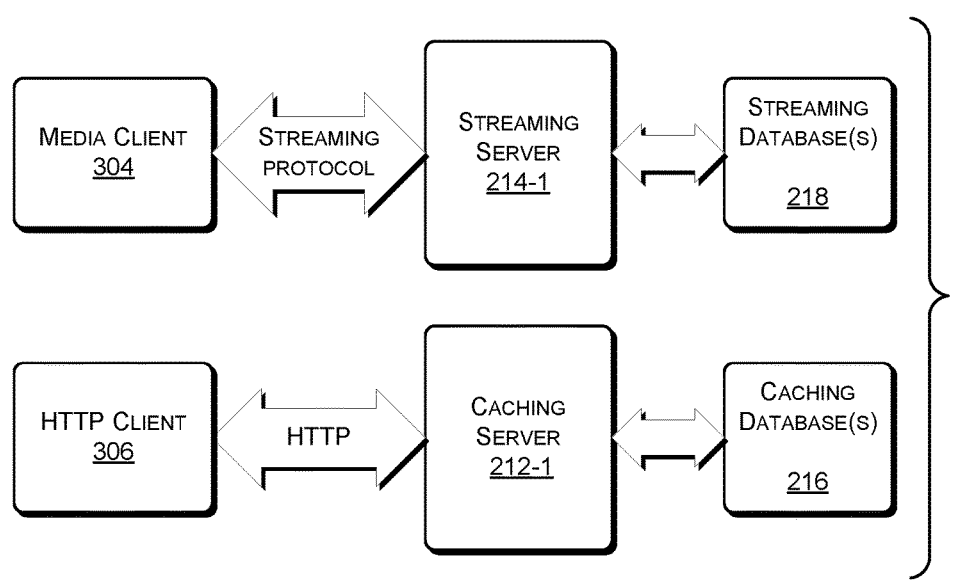

As shown in FIG. 4, in operation, media client 304 is provided with a streaming media resource from a streaming server 214-1 using an appropriate streaming protocol. The steps associated with providing the streaming media resource are typically as follows:

1. The media client 304 requests a specific electronic resource from the streaming server 214-1 using the proprietary protocol associated with these devices (e.g., Adobe® Flash®).
2. The streaming server 214-1 references configuration data from the streaming database(s) 218, and, assuming the end user is authorized and authenticated, the streaming server 214-1 obtains requested electronic streaming resource from the streaming database(s) 218.
3. The requested electronic streaming resource is then delivered (streamed) from the streaming server 214-1 to the media client 304.

An analogous process occurs for HTTP client 306 being provided with an HTTP resource from the caching server 208-1.

Those of skill in the art will realize and understand, upon reading this description, that the client 302 connects to the cache cluster 204' via a network such as the Internet (not shown in the drawings). The manner in which the client is associated with a particular cache cluster site or a particular server within that site is referred to as rendezvous, and is not described here. Those of skill in the art will realize and understand, upon reading this description, that within a CDN rendezvous may be implemented using name servers and the domain name system.

There are disadvantages to having separate storage for streaming resources and HTTP resource. These include the overhead of having an abundance of storage and the fact that the configuration data for traditional streaming servers is relatively less sophisticated than configuration data for caching servers.

Description

Figure 5:
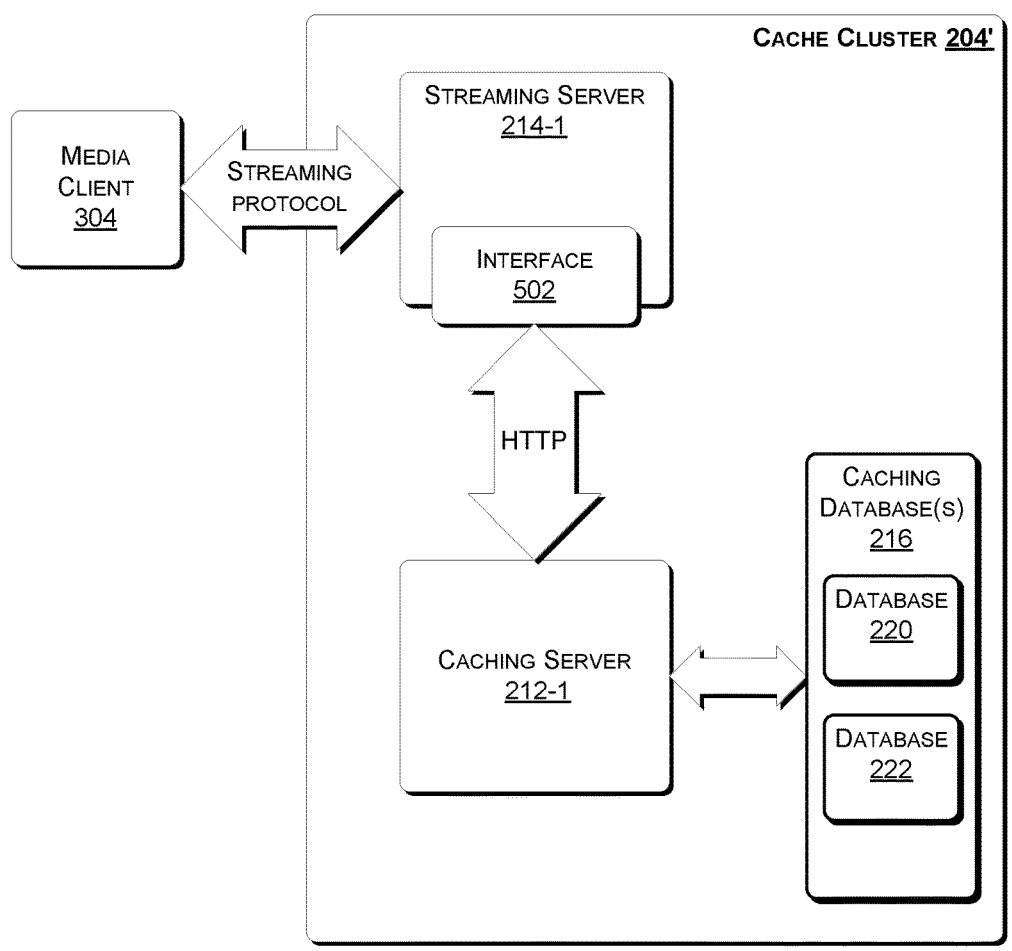
FIGS. 5-6 depict a cache cluster with an interface between a streaming server and a caching server.

FIG. 5 shows various components of cache cluster 204' that includes streaming server 214-1 and caching server 212-1. An interface 502 is associated with the streaming server 214-1. The interface 502 is preferably implemented as a software plugin on the streaming server 214-1, although it may be a separate component (e.g., interface 604 in FIG. 6). Using the interface 502 (or 604), the streaming server 214-1 is able to make use of the caching database(s) 216 in order to obtain streaming media content. Instead of using separate streaming media database(s), streaming media and their associated metadata are stored in the caching database(s) 216. The interface 502 (or 604) translates interactions/requests from the streaming server 214-1 into corresponding HTTP requests which may then be handled by the caching server 212-1.

Interaction between the media client 304 and the streaming server 214-1 continues to use the appropriate streaming protocol (i.e., the streaming protocol for the type/format of media being streamed), although the streaming server 214-1 does not interact directly with the database(s) in the cache cluster and it does not interact with a streaming database.

Figure 6:
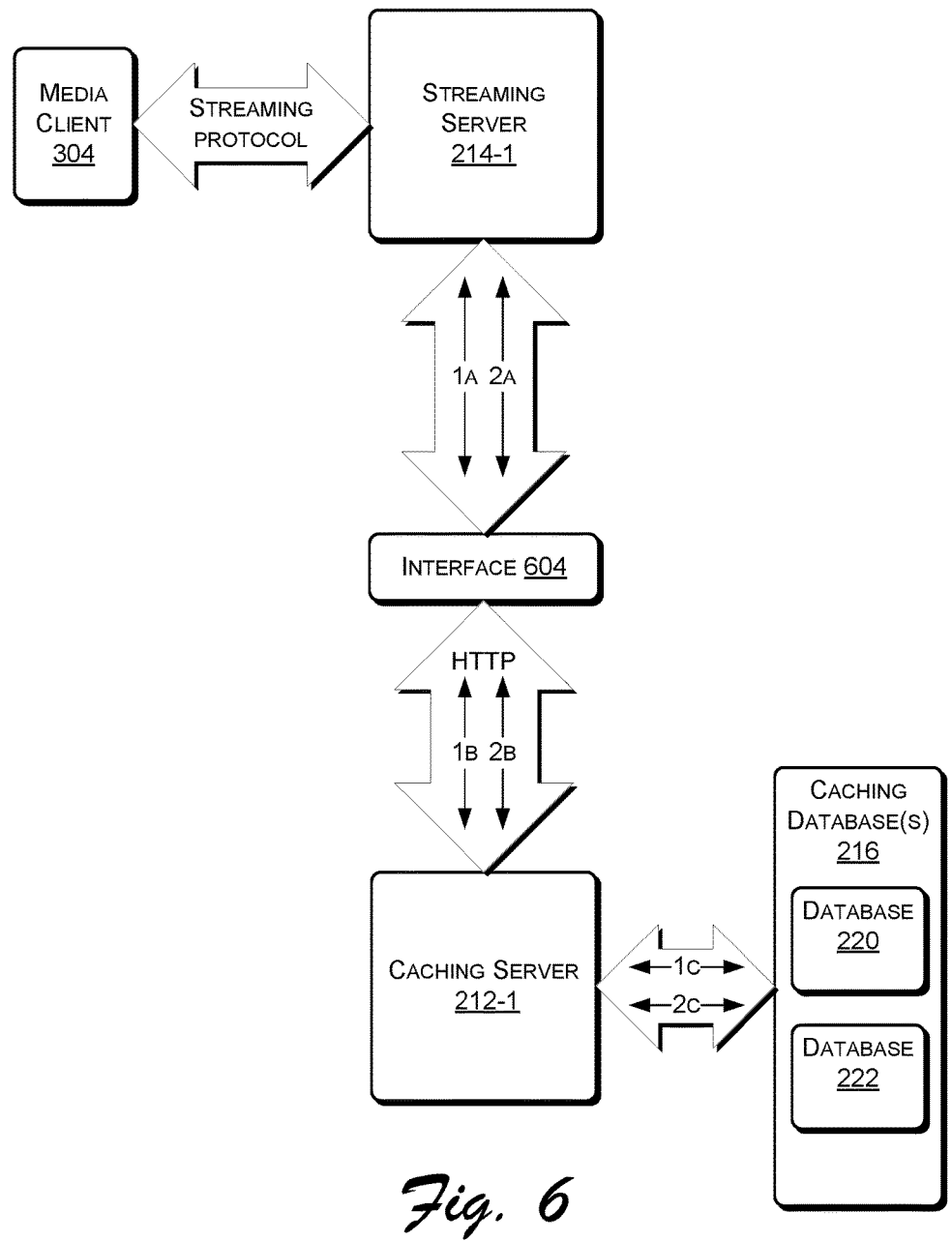

FIG. 6 shows operation of an exemplary interaction in which media client 304 is provided with a streaming media resource from a streaming server 214-1 using an appropriate streaming protocol. In FIG. 6 the interface 604 is shown as a separate component from the streaming server 214-1, although, as noted above, it is preferably integrated into the streaming server (e.g., as a plugin).

The steps associated with providing the streaming media resource are as follows (in response to media client 304 requesting an electronic resource from the streaming server 214-1):

1. The streaming server 214-1 asks for configuration data associated with the requested resource (at 1a). This request is made of the caching server 212-1 through the interface 604 which converts the request to a corresponding HTTP request (at 1 b). The caching server 212-1 obtains the required configuration data from database 220 in the caching databases 216. The caching server 212-1 may use the configuration data to perform such processes as authentication, geo-blocking evaluation, authorization and/or licensing, etc. The caching server 212-1 passes some or all of the configuration data to the streaming server 214-1. Some of the configuration data may relate to the streaming protocol, in which case it will be bandied by the streaming server 214-1. Some of the configuration data may relate to CDN and/or content provider policies, and those configuration data may be handled by the caching server 212-1. The streaming server 214-1 may also use some the configuration data to perform such processes as authentication, geo-blocking evaluation, authorization and/or licensing, etc,
2. Assuming that the request passes required authentication, authorization, etc., the streaming server 214-1 then pulls the actual media resource from the caching server 212-1. Again, the pull request is made through the interface 604 which converts the request to a corresponding HTTP request (at 2b) for the actual media resource. The caching server 212-1 obtains the required media resource data from database 222 in the caching databases 216 (at 2c) and provides (serves) that media resource to the streaming server 214-1 via the interface 604.

Embodiments of the present invention thus provide an approach for use by streaming servers to use functionality of caching servers, including, without limitation, functionality of caching servers in pulling electronic resources from data storage and/or accessing configuration data from data storage.

Given the extension of functionality available to the streaming server 106, separate data storage is not needed for the streaming servers.

It should be appreciated that the term "server" represents a collection of processes implemented in software and/or firmware by a computer. While these processes are each implemented on the same device, in accordance with one embodiment, any number of these processes could alternatively be implemented on any number of devices.

The streaming servers, the interface software and the caching servers are shown in the drawings on single device, however, it should be appreciated that any of these components may be separately located on more than one device. That said, the interface software is preferably located on at least the same device as the streaming server and allows the streaming server to communicate with the caching server using HTTP protocol.

The Interface

The interface 502, 604 has a number of roles. A primary role of the interface 502, 604 is to convert requests from the streaming server into HTTP requests that can be sent to a caching server. The other roles of the interface include intercepting (or accepting) requests from the streaming server 214-1 after conversion to HTTP, making those requests of a caching server.

URLs are described in RFC 1738, Uniform Resource Locators (URL), by T. Berners-Lee et al., the entire contents of which are fully incorporated herein for all purposes. The general form of a URL is:

<<protocol>>://<<host>>/<<path>>

For HTTP URLs, the protocol is "http", and so in an HTTP URL the "<<protocol>>" in the general URL is replaced by "http". For streaming URLs, the protocol is one of: "rtmp", "rtmpe", "rtmpt", "rtmpte", etc. RTMP means Real Time Messaging Protocol; RTMPE means Encrypted RTMP; RTMPT means encapsulated RTMP; and RTMPTE means encrypted, encapsulated RTMP. Those of skill in the art will realize and understand, upon reading this description, that different and/or other streaming protocols may be used.

Although the following discussion is made with reference to the standard RTMP protocol, it should be appreciated, however, that the other RTMP protocols (e.g., RTPMPT, RTMPE, RTMPTE, etc.) are treated in the same way.

A typical streaming request with the RTMP protocol uses a streaming URL with, e.g., one of the following forms:

URL1:
protocol://host/application/[instance]/[path_to_stream]/[codec:]streamname[.ext]

URL2:
protocol://host/application/[instance]/[codec:] [path_to_stream]/streamname[.ext]

where the [codec.], [.ext], [instance], and [path_to_stream] parts are optional (as indicated by the square brackets). (As used herein, following well-known and conventional notation, URL components denoted in square brackets ("[" and "]") are considered optional.) The protocol is one of: "rtmp", "rtmpe", "rtmpt", "rtmpte", etc. The list of codecs currently includes: flv:, id3:, mp3:, mp4: and raw:, although those of skill in the art will realize and understand that other codecs may be used, and that the present invention is not limited to only the currently-existing codecs. The optional stream name extension (as indicated by the ".ext" in square brackets) reflects the type of the stream (e.g., mp3, mp4, flv, f4v, mov, avi, etc.). In many cases the stream type may be determined from the codec or the application or some other information in the URL if the extension is not provided. It should be understood that the letters "ext" in the extension, if provided, are the letters for the appropriate extension (e.g., "mp3", "mp4", "flv", "f4v", "mov", "avi", and so on).

The streaming server 214-1 issues various instructions/requests using this form of URL. These instructions include instructions to connect, play, stop, or disconnect. In order to obtain and render a stream, a streaming client goes through two phases: connect and play. The connect phase only uses part of the streaming URL. In particular, in preferred implementations, connect URL does not include the "/path_to_stream/[codec:]streamname[.ext]" part(s) of the streaming URL. Thus, to connect to a stream denoted by URL1 (or URL2), the streaming client does (or issues or invokes):

CONNECT(protocol://host/application/instance/)

Following the CONNECT instruction/command comes a PLAY instruction, which only includes the "/path_to_stream/[codec:]streamname[.ext]" part(s) of the URL. It is important to understand difference between streaming protocol (such as RTMPx) and HTTP. HTTP is a stateless protocol, meaning that every single HTTP request has enough information for server to process it independently. Streaming protocols (such as RTMPx) are statefull, i.e. streaming server must preserve client state across transactions. A streaming client can request and play multiple streams over the same connection to the streaming server.

Thus, a streaming player makes two requests—a "connect" phase and a "play" phase-splitting the streaming URL into two parts. The "connect" conveys protocol, host, application, and instance information, while the "play" conveys the remainder. The streaming URL may be considered to be of the form:

protocol://connect_part/play_part where connect_part is used by the CONNECT phase, and includes protocol, host, application, and instance information, and where the play_part is used by the PLAY phase.

In the exemplary URLs above (URL1 and URL2), the connect_part is "protocol://host/application/[instance]", and the play_part is "/[path_to_stream]/[codec:]streamname[.ext]" or "[codec:] [path_to_stream]/streamname[.ext]".

For example, to connect to an MP3 stream at the following URL:

Rtmp://xyz.com/app1/inst1/path1/codec1:foo.mp3 [URL3]

the streaming client does (performs/invokes):

CONNECT(rtmp://xyz.com/app1/inst1/)

Followed by

PLAY(/path1/codec1/foo.mp3)

These CONNECT and PLAY instructions are intercepted by the interface 604, 502 which converts them into the appropriate HTTP commands for the caching server 212-1. Specifically, the interface 604, 502 extracts (obtains/determines) the following information from the streaming URL (i.e., from the parameters to the CONNECT and PLAY commands): the host, the path to the stream, and the stream name. Those of skill in the art will realize and understand, upon reading this description, that the interface may obtain the required information directly or indirectly from the parameters to the CONNECT and PLAY commands, and that the term "extracts" is not limited to a string extraction or the like, and covers any manner of obtaining or otherwise determining the information.

Using the example of URL 3, the interface 604, 502 extracts (obtains/determines) the following:

| host | xyz.com |
|---|---|
| path to stream | path1 |
| stream name | foo.mp3 |

If the streaming URL omits the optional stream type, the interface determines the type, e.g. from the codec or from other information in the URL. In preferred implementations the type is needed because the caching server may have copies of the same stream encoded in different formats.

The information extracted (or derived) from the streaming URL used by the interface 604, 502 to create a corresponding HTTP-based URL of the form:

http://host/path_to_stream/streamname.ext [URL4]

In a present embodiment, the application name is provided as the value of the HTTP "Host:" header.

The interface 604, 502 uses this generated HTTP-based URL (or the information in or associated with that URL) to make HTTP requests of the caching server 212-1. In the example of URL 2 (above), the following HTTP-based URL is generated by the interface 604, 502:

http://xyz.com/path1/foo.mp3 [URL 4]

The interface 604, 502 then makes the following HTTP GET request, with the HOST HEADER set to "app1":

GET/inst1/path1/foo.mp3
Host: app1

The application and instance may be used to determine which media resource is returned to the streaming server, and so must be provided to the cache. Those of skill in the art will realize and understand, upon reading this description, that the path may contain app1 with some other value for "Host:".

The interface 604, 502 may use a well-known program such as, e.g., cURL to make the HTTP requests of the cache server. In response to receipt of that GET request caching server 212-1 obtains the requested streaming resource and provides it to the streaming server 214-1.

Figure 7:
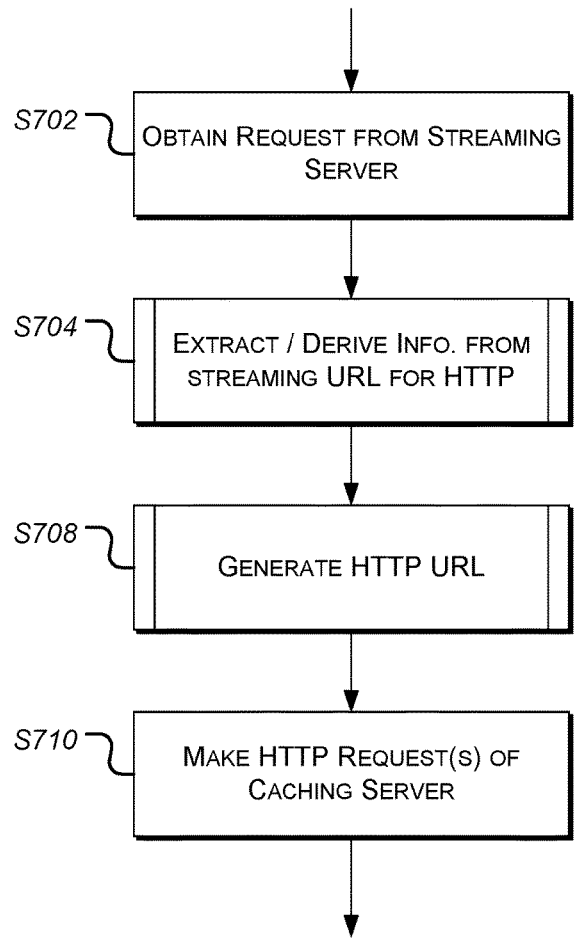
FIG. 7 is a flow chart depicting operation of the interface between the streaming and caching servers.

FIG. 7 is a flowchart according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein. It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

With reference to the flowchart in FIG. 7, the interface 502, 604 obtains one or more requests from a streaming server (at S702). The request(s) include information from an RTMP-based streaming URL (e.g., of the form of URL 1 above). If the request requires data from the caching server (e.g., it is a connect or play request), then the interface 604 extracts or derives appropriate HTTP information from the streaming URL (at S704). In particular, the interface determines (extracts or derives) the host, path to stream, and stream name from the streaming URL. In some cases it may be necessary to normalize the streaming URL before extraction takes place. Further, even though the type extension (e.g., mp3, mp4, flv, f4v, mov, avi, etc) may be optional in the streaming URL, it is required for the HTTP information.

With the required information determined from the streaming URL, the interface generates a corresponding HTTP URL (at S708). Using this generated HTTP URL, the interface makes the corresponding HTTP GET request(s) from a cache server (at S710).

It should be understood that the interface performs a similar function for configuration data and streaming content that is requested by the streaming server.

Those of skill in the art will realize and understand, upon reading this description, that a streaming server does not have to modify its protocols in order to operate with the caching servers. As far as the streaming server is concerned, it is interacting with a streaming database. The interface 502, 604 effectively intercepts the streaming server's interactions and directs them to the caching server(s). It should further be appreciated that the streaming server's interactions with the media client(s) still follows the same (potentially proprietary) protocol(s) as they did when a streaming database was in use. Likewise, as far as the caching server is concerned, it is dealing with an HTTP client. This approach allows for new and different streaming protocols and/or streaming servers to be used without modification of interface to the caching server(s).

Figure 8:
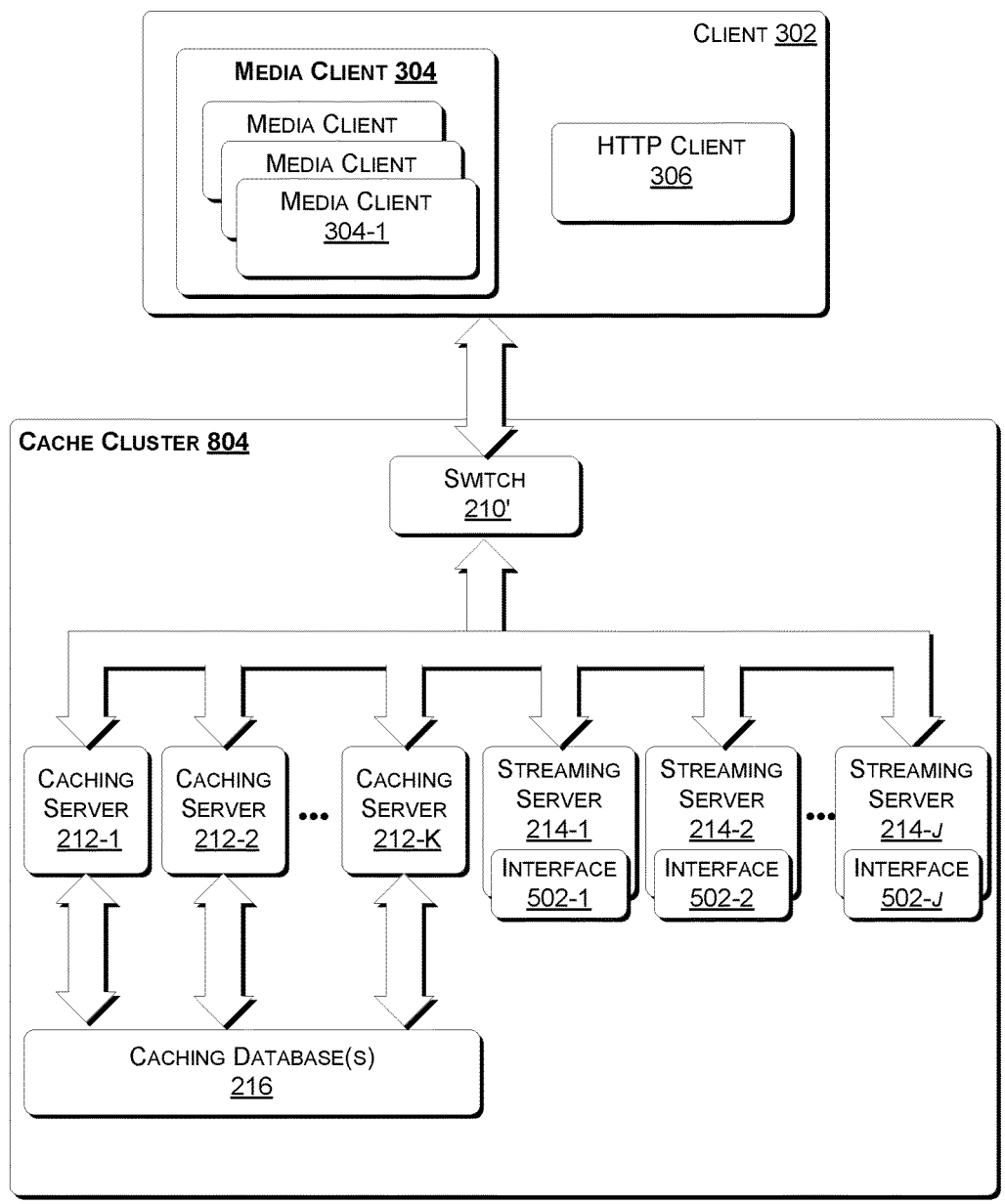
FIG. 8 depicts a cache cluster with multiple caching and streaming servers, and with interfaces between the streaming and caching servers.

While a streaming server's interface can make the HTTP calls from any caching server, in the context of a CDN, it is preferable that the caching server be one that is close (by some measure of network cost and/or distance) to the streaming server. In a presently preferred embodiment, streaming servers obtain their content from caching databases and using caching servers in the same cache cluster. Thus, e.g., as shown in FIG. 8, a cache cluster 804 includes a number of caching servers 212-1, 212-2, . . . , 212-$k$ (collectively 212) and a number of streaming servers 214-1, 214-2, 214-$j$ (collectively 214). Each caching server has a corresponding interface 502-1, 502-2, . . . , 502-$j$, respectively. In the preferred embodiments, these interfaces are implemented as plugins on the streaming servers. The caching servers 212 and the streaming servers 214 are connected to a switch 210, e.g., an Ethernet switch. There may be different numbers of streaming and caching servers.

In these preferred embodiments, the interface 502-$m$ associated with streaming server 214-$m$ will preferably use one of the caching servers 212 in the same cluster 804 to access the caching database 216.

Figure 9:
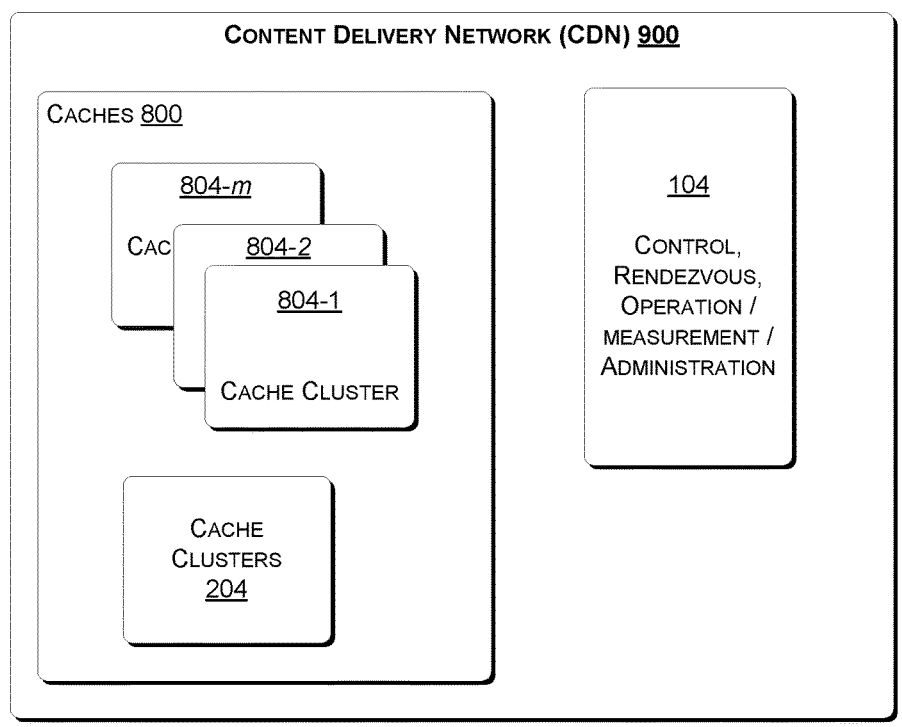
FIG. 9 depicts a CDN with the cache clusters of FIG. 8.

As shown in FIG. 9, a CDN 900 including streaming servers with interfaces, as described above, includes a number of caches 800, including a number of cache clusters 804-1, 804-2, . . . 804-$m$ collectively cache clusters 804). The CDN's caches 800 may also include cache clusters 204 which do not serve HTTP content (cached content) outside of the cluster, and cache clusters 204 which do not include streaming servers or in which the streaming servers do not use an interface to a caching database. Each streaming server may also be designated a caching server to use, which may be on the same device as the streaming server.

Preferably the streaming servers 214 in a particular cache cluster 804 will all have the same VIP (e.g., $VIP_{ss}$). Similarly, the caching servers 212 in a particular cluster have the same VIP (e.g., $VIP_{cs}$). External requests to the cluster via the switch 210) are made to a VIP, and the switch passes those requests to all servers in the cluster. The servers in the cluster decide for and among themselves which server is to handle a request. This process is described, e.g., U.S. patent application Ser. No. 12/390,560, filed Feb. 23, 2009, and in U.S. patent application Ser. No. 12/880,313, filed Sep. 13, 2010, the entire contents of each of which are fully incorporated herein for all purposes.

In some cases, a particular cache cluster may be configured so that the caching servers are not used directly to serve content to requesting clients outside the cluster, and are used to handle only streaming requests (made via the interfaces 502). In these cases the CDN will be configured so that they do not send HTTP traffic to the streaming-only clusters. Other cache clusters may serve both streaming and cache content externally.

When a streaming server's interface needs to make a request of a caching server, one of the caching servers needs to be selected. The streaming servers' interfaces may make their HTTP requests via the switch, using the VIP ($VIP_{cs}$) of the cluster servers in the same cluster. In that way, the cluster servers can use the appropriate load balancing and other selection process to determine which of them is to handle the request.

In cache clusters that serve both streaming and cache content, the VIP for the cache servers and the streaming servers may be the same (i.e., in some cases VIPs, is the same as $VIP_{cs}$). In those cases all servers connect to the switch 210 will get all requests, and the servers themselves will select who is to handle the requests (based, e.g., on the type of request—e.g., streaming versus HTTP—and on their respective loads). Those of skill in the art will realize and understand, upon reading this description, that different and/or other factors may be used within a cluster to determine which server handles a particular request.

As described above (with reference to FIG. 6), a typical streaming flow has two parts: an authentication/authorization part, followed by the actual delivery. In the approach described here, authentication may take place at two levels. The streaming servers may still perform whatever authentication/authorization is required by the particular streaming protocol in use. This process may require authentication/authorization information from the caching databases. In addition, the caching servers may perform authentication, authorization, logging and other data collection required for CDN operation. In this way the CDN can implement its own and content provider policies independent of the streaming protocols.

For example, a content provider may pay different rates to the CDN operator for different kinds or encodings of streamed content. Or certain content may be restricted to certain geographical areas (e.g., for copyright purposes). The caching servers can be used to implement some or all of these policies, leaving the streaming server to deal with streaming.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 10:
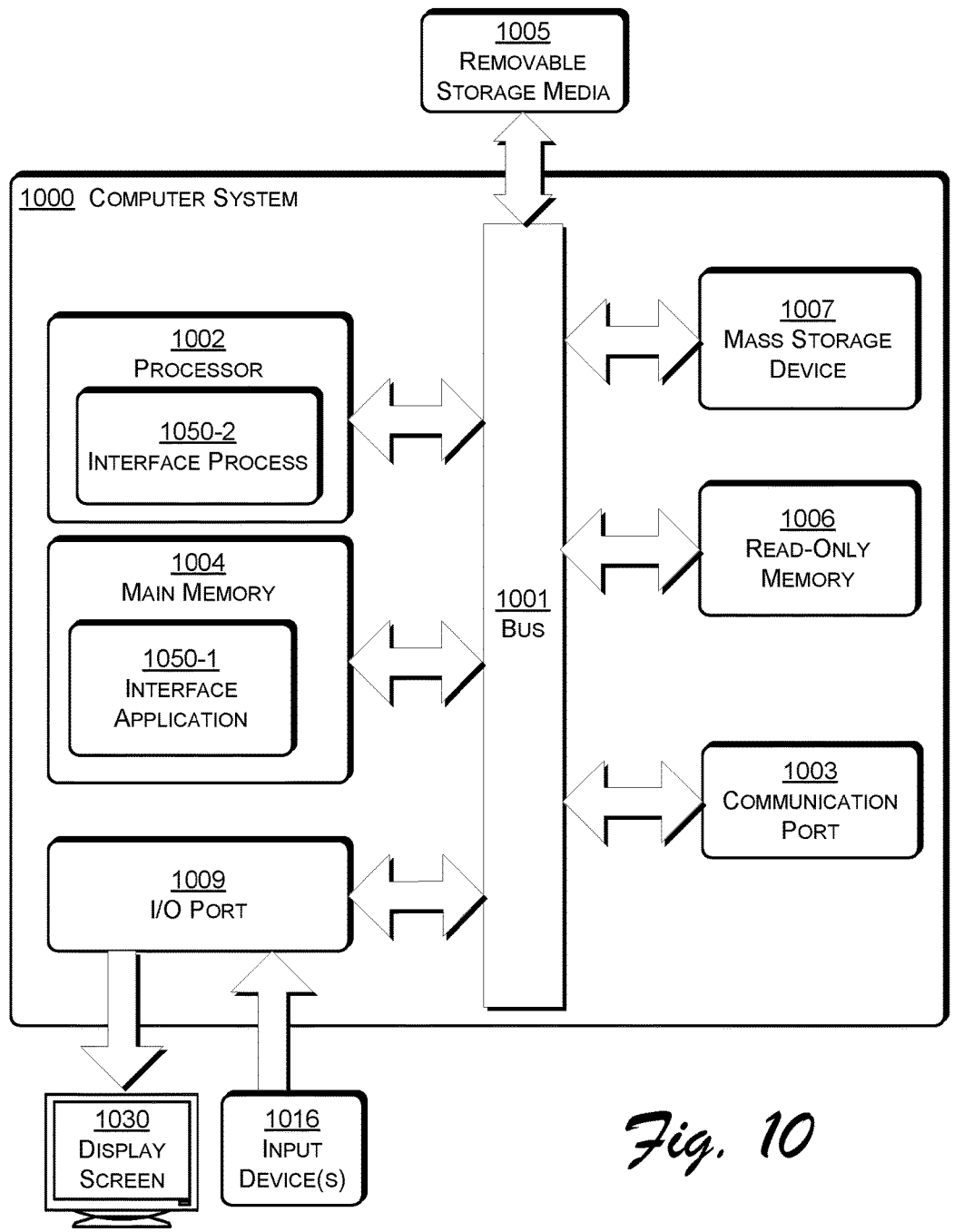
FIG. 10 is a schematic diagram of a computer system.

FIG. 10 is a schematic diagram of a computer system 1000 upon which embodiments of the present disclosure may be implemented and carried out.

According to the present example, the computer system 1000 includes a bus 1001 (i.e., interconnect), at least one processor 1002, at least one communications port 1003, a main memory 1004, a removable storage media 1005, a read-only memory 1006, and a mass storage 1007.

Processor(s) 1002 can be any known processor, such as, but not limited to, an Intel® Itanium® or Itanium 2® processor(s), AMD® Opteron® or Athlon MP® processor(s), or Motorola® lines of processors, and the like. Communications port(s) 1003 can be any of an RS-232 port for use with a modem based dial-up connection, a 10/100 Ethernet port, a Gigabit port using copper or fiber, or a USB port, and the like. Communications port(s) 1003 may be chosen depending on a network such as a Local Area Network (LAN), a Wide Area Network (WAN), a CDN, or any network to which the computer system 1000 connects. The computer system 1000 may be in communication with peripheral devices (e.g., display screen 1030, input device(s) 1016) via Input/Output (I/O) port 1009.

Main memory 1004 can be Random Access Memory (RAM), or any other dynamic storage device(s) commonly known in the art. Read-only memory 1006 can be any static storage device(s) such as Programmable Read-Only Memory (PROM) chips for storing static information such as instructions for processor 1002. Mass storage 1007 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1001 communicatively couples processor(s) 1002 with the other memory, storage and communications blocks. Bus 1001 can be a PCI/PCI-X, SCSI, a Universal Serial Bus (USB) based system bus (or other) depending on the storage devices used, and the like. Removable storage media 1005 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-R.OM), etc.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMS, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 1004 is encoded with interface application 1050-1 that supports the interface functionality as discussed herein. Interface application 1050-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1002 accesses main memory 1004 via the use of bus 1001 in order to launch, run, execute, interpret or otherwise perform the logic instructions of the interface application 1050-1. Execution of interface application 1050-1 produces processing functionality in content delivery process 1050-2. In other words, the content delivery process 1050-2 represents one or more portions of the interface application 1050-1 performing within or upon the processor(s) 1002 in the computer system 1000.

It should be noted that, in addition to the content delivery process 1050-2 that carries out operations as discussed herein, other embodiments herein include the interface application 1050-1 itself (i.e., the un-executed or nonperforming logic instructions and/or data). The interface application 1050-1 may be stored on a computer readable medium. (e.g., a repository) such as a floppy disk, hard disk or in an optical medium. According to other embodiments, the interface application 1050-1 can also be stored in a memory type system such as in firmware, read only memory (ROM), or, as in this example, as executable code within the main memory 1004 (e.g., within Random Access Memory or RAM). For example, interface application 1050-1 may also be stored in removable storage media 1005, read-only memory 1006, and/or mass storage device 1007.

Example functionality supported by computer system 1000 and, more particularly, functionality associated with interface application 1050-1 is discussed above with reference to FIGS. 6-7.

Those skilled in the art will understand that the computer system 1000 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

It should be appreciated that the words "first" and "second" in the claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

Thus are described methods, systems, and devices extending caching network functionality to existing streaming media servers.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A system for content delivery comprising:
    a streaming media server;
    a caching server;
    one or more storage devices accessible to the caching server, wherein the one or more storage devices store content; and
    interface software configured to initiate retrieval, by the caching server, of at least one electronic streaming resource from the one or more storage devices in response to an end user's request for the at least one electronic streaming resource received by the streaming media server; wherein the interface software is configured to:
        receive an instruction from the streaming media server that includes a first electronic resource locator of the at least one electronic streaming resource;
        convert the first electronic locator into a second electronic resource locator, wherein the first electronic resource locator is in a streaming format and wherein the second electronic resource locator is in a different format; and
        use the second electronic resource locator to initiate retrieval, by the caching server, of the at least one electronic streaming resource.

2. The system as recited in claim 1 wherein the interface software is integrated into the streaming media server.

3. The system as recited in claim 2 wherein the interface software is a plugin on the streaming media server.

4. The system as recited in claim 1 wherein the one or more storage devices also store configuration data related to at least some of the content, and wherein the interface software is further configured to initiate retrieval, by the caching server, of at least some configuration data related to the at least one electronic streaming resource.

5. An interface device, in a system for content delivery comprising a streaming media server, a caching server, and one or more storage devices accessible to the caching server, wherein the storage device stores streaming content, the interface device comprising:
  at least once processor;
  memory, operatively connected to the at least one processor and containing instructions that, when executed by the at least one processor, cause the interface device to:
    initiate retrieval, by the caching server, of at least one electronic streaming resource from the one or more storage devices in response to an end user's request for the at least one electronic streaming resource received by the streaming media server;
    receive an instruction from the streaming media server that includes a first electronic resource locator of the at least one electronic streaming resource;
    convert the first electronic resource locator into a second electronic resource locator, wherein the first electronic resource locator is in a streaming format and wherein the second electronic resource locator is in a different format; and
    use the second electronic resource locator to initiate retrieval, by the caching server, of the at least one electronic streaming resource.

6. The interface device as recited in claim 5 wherein the instructions cause the interface device to initiate retrieval by the caching server of configuration data.

7. The interface device as recited in claim 5 wherein the device is integrated into the streaming media server.

8. The interface device as recited in claim 7 wherein the device is a plugin on the streaming media server.

9. A method implemented by an interface device in a system for content delivery that includes a streaming media server, a caching server, and one or more storage devices accessible to the caching server, wherein the storage device stores streaming content, the method comprising:
  receiving, in response to an end user's request for the at least one electronic streaming resource, an instruction from the streaming media server that includes a first electronic resource locator of the at least one electronic streaming resource;
  converting the first electronic resource locator into a second electronic resource locator, wherein the first electronic resource locator is in a streaming format and wherein the second electronic resource locator is in a different format; and
  using the second electronic resource locator to initiate retrieval, by the caching server, of the at least one electronic streaming resource.

10. The method of claim 9, further comprising initiating retrieval, from the caching server, of configuration data related to the at least one electronic streaming resource.

11. The method of claim 9, wherein the first electronic resource locator is a Real Time Messaging Protocol (RTMP) URL.

12. The method of claim 9, wherein the different format is a HyperText Transfer Protocol format.

* * * * *